R. L. MORGAN.
LOADING AND UNLOADING DEVICE.
APPLICATION FILED APR. 24, 1909.

982,977.

Patented Jan. 31, 1911.

Witnesses:
C. F. Wesson
E. M. Allen

Inventor
R. L. Morgan
By Attorneys
Southgate & Southgate

UNITED STATES PATENT OFFICE.

RALPH L. MORGAN, OF WORCESTER, MASSACHUSETTS.

LOADING AND UNLOADING DEVICE.

982,977.

Specification of Letters Patent. Patented Jan. 31, 1911.

Application filed April 24, 1909. Serial No. 491,941.

*To all whom it may concern:*

Be it known that I, RALPH L. MORGAN, a citizen of the United States, residing at Worcester, in the county of Worcester and State of Massachusetts, have invented a new and useful Loading and Unloading Device, of which the following is a specification.

This invention relates to an apparatus for loading and unloading vehicles for trucking and freighting purposes, particularly motor trucks, in order to extend their usefulness, avoid the delays which are necessitated by the old methods of loading, and decrease the cost of operation.

The principal objects of the invention are to provide means independently of the truck whereby a loaded box, crate, or removable body can be deposited on the platform of the truck and removed therefrom in a simple and expeditious manner without the employment of complicated mechanism, and of such simple and effective construction that the loading operation can be performed without materially jarring the load or running any serious risk of accident; also to provide such construction in combination with a platform or other stationary element from and to which the load is conveyed.

Reference is to be had to the accompanying drawings, in which—

Figure 1:
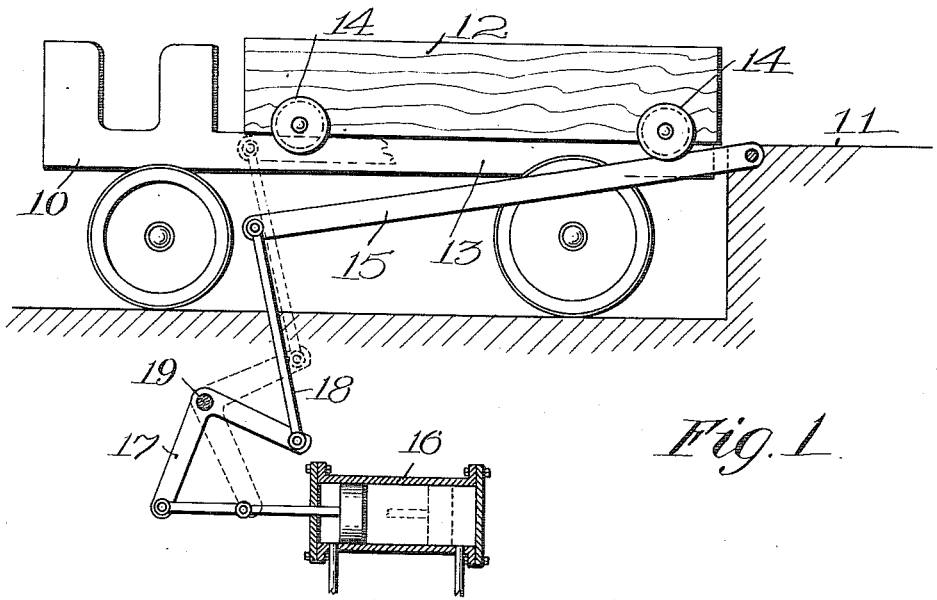
Figure 2:
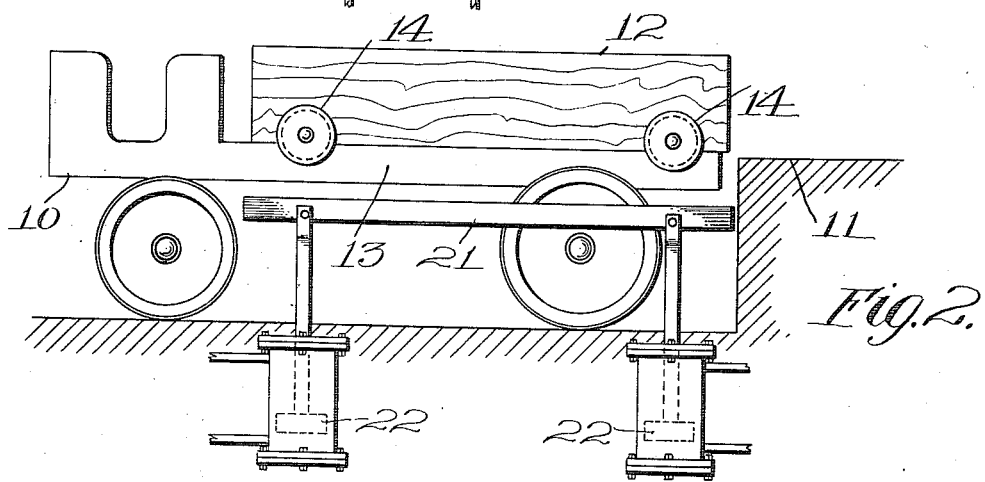

Figure 1 is a side view partially diagrammatic in form showing one embodiment of the invention; Fig. 2 is a similar view showing another way in which the invention can be carried out; and Fig. 3 is an end view of the construction shown in Fig. 2.

In the form of the invention shown in Fig. 1, a motor truck 10 is shown as backed up to a fixed platform 11 from which the truck is to be loaded or at which it is to be unloaded. It will be understood however that the truck may be loaded and unloaded from the side as well as from the rear. The truck is shown as provided with a removable crate or body 12 in the form of a box or receptacle for receiving the load for the vehicle. This preferably is loaded by hand or otherwise on the platform 11 or in any other convenient place and brought up into position on this platform to be conveyed on the platform 13 of the truck. The crate or body portion 12 may, if desired, be provided with rollers 14 for facilitating manipulation thereof. In this form of the invention a pair of supports or tracks 15 is shown located at the sides of the truck and at substantially the level of both platforms 11 and 13, so that the trucks can back in between them. They are pivoted at a point near the platform 11 and are adapted to support the rollers and are intended to be moved up and down. In the form shown in Fig. 1, a hydraulic, compressed air, or steam cylinder 16 is shown connected by bell-crank 17 with a link 18 which is connected with one end of the track 15. It will be understood that the bell-crank is fixed to a rock shaft 19 and that the parts between it and the track 15 are duplicated on the opposite side. Any convenient mechanism may be substituted for this for the purpose of raising and lowering the ends of the tracks 15.

In the use of this device, the piston of the cylinder 16 is operated so as to raise the tracks 15 and the box or crate is then rolled out over the platform of the truck on these tracks. This may be done by hand or otherwise as desired. Then the piston is operated to lower the ends of the tracks and allow the crate to come down on the platform of the motor truck. In unloading the reverse operation takes place, and if desired the tracks can be raised high enough so as to allow the crate to roll down on the platform 11, or if desired the platform 13 may be made slightly lower than the platform 11 and the tracks inclined slightly so as to permit the crate to roll down easily on the truck, but I prefer to have the tracks substantially horizontal during both the loading and unloading operations.

Figure 3:
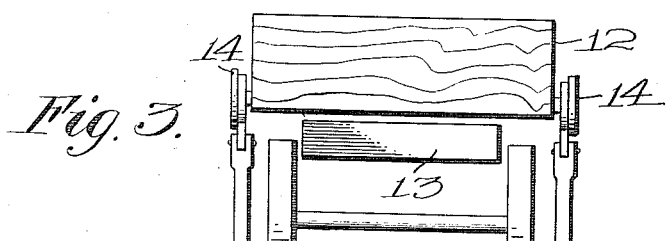

In the form of the invention shown in Figs. 2 and 3 the parts 10, 11, 12, 13 and 14 are the same as those described above, but in place of the tracks 15 are two tracks 21 which reciprocate vertically, being operated by pistons 22 in two vertical power cylinders. The operation is similar to that described above, and in this case the track preferably is kept horizontal during both loading and unloading operations. In both cases the supports or tracks are so located as not to interfere with the movements of the truck in backing in and going out.

It will be seen that this invention provides an apparatus for loading and unloading motor trucks which is a very simple construction, does not require any modification of the truck itself, can be applied to trucks drawn by horses, and will save practically all the time which has heretofore been wasted in loading and unloading by hand, so that the trucks or other vehicles may be kept on the road in actual operation practically all the time.

While I have illustrated and described two embodiments of the invention I am aware that many modifications may be made therein by any person skilled in the art without departing from the scope of the invention as expressed in the claims. Therefore I do not wish to be limited to all the details of construction shown and described, but What I do claim is:—

1. In an apparatus of the class described, the combination of a stationary platform, a truck adapted to be moved up to the platform, a pair of tracks located at the sides of the truck and having their ends extending substantially to the platform, said tracks being adapted to receive the rollers of a removable crate or body for the truck, and power operated means independent of the truck for raising and lowering said tracks.

2. In an apparatus of the class described, the combination of a fixed platform, a truck having a platform of substantially the same height as the fixed platform, a support located at substantially the level of said platforms and pivoted to the fixed platform, and means for swinging the support on its pivots.

3. In an apparatus of the class described, the combination of a motor truck, and power operated means independent of the truck and below it for moving a body or crate to and from the truck while the latter is in stationary position.

In testimony whereof I have hereunto set my hand, in the presence of two subscribing witnesses.

RALPH L. MORGAN.

Witnesses:
A. E. FAY,
C. F. WESSON.